Oct. 11, 1932.    J. MUIR    1,881,854
INSTRUMENT FOR THE IMPLANTATION OF RADON SEEDS
Filed Dec. 7, 1929    2 Sheets-Sheet 1
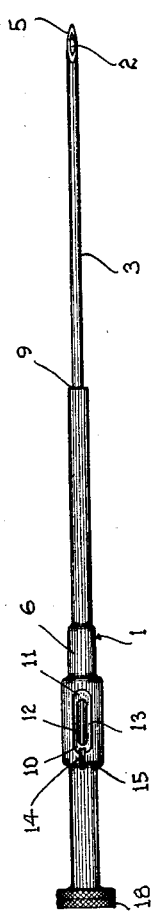
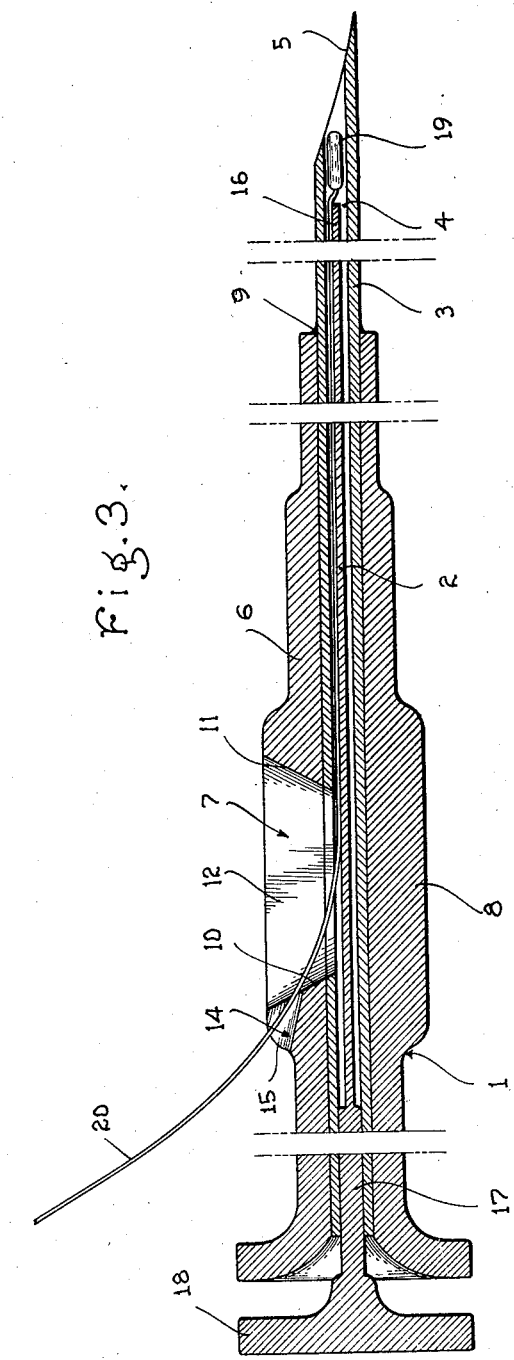
Inventor,
JOSEPH MUIR.
By Ivan P. Tashof,
Attorney

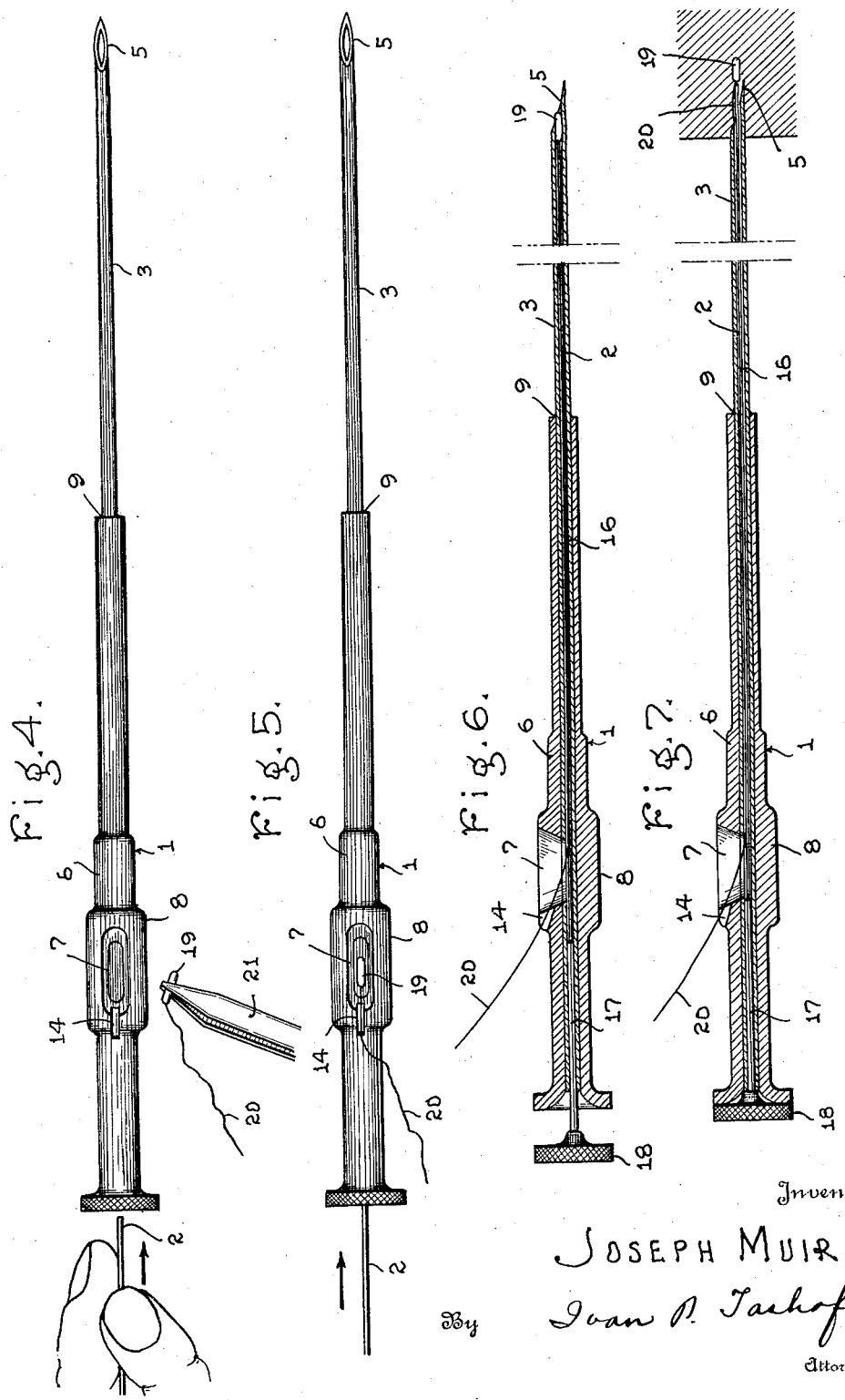

Patented Oct. 11, 1932

1,881,854

UNITED STATES PATENT OFFICE

JOSEPH MUIR, OF NEW YORK, N. Y., ASSIGNOR TO THE RADIUM EMANATION CORPORATION, OF NEW YORK, N. Y., A CORPORATION OF DELAWARE

INSTRUMENT FOR THE IMPLANTATION OF RADON SEEDS

Application filed December 7, 1929. Serial No. 412,352.

The present invention relates to instruments for the implantation of radon seeds and more particularly removable radon seeds specifically disclosed in U. S. Patent No. 1,688,245, issued to Joseph Muir.

The removable seed has become to a large extent the customary form in which radium emanation is used for the treatment of cancerous growths in the human being. When the use of the removable seed was first inaugurated, the instruments used for the implantation thereof in tissue were unsatisfactory, and therefore the instrument set forth in U. S. Patent No. 1,655,158, issued to Joseph Muir, was devised and the latter has been in current use. This type of instrument, while capable of advantageous use, has several important defects.

Before discussing these defects and indicating how the instrument of the present invention overcomes the same, it is desired to point out that radon seeds are radio-active, and therefore, the operator performing the implantation operation must be afforded sufficient protection from the effects of the radon. It is desirable that the time of handling, including the implantation of the seeds, be reduced to a minimum, so as to minimize the hazards involved. Further, as the operation of implanting radon seeds is usually a rather delicate operation, it is desired to diminish the actual number of handling operations so that the operator may give more of his attention to, and concentrate his efforts on the accurate placement of the seeds in the tissue.

The instrument previously used for the implantation of removable seeds, such as set forth in U. S. Patent No. 1,655,158, to Muir, is essentially a three-piece instrument. The instrument proper is provided with a spring clip, cooperating with the loading slot to insure the automatic loading of a radon seed into the lumen of the implanter during the implantation process, and after the tissue has been punctured. The instrument is also provided with a pointed trocar, which completely fills the lumen of the instrument, the point of the trocar extending through the piercing end of the instrument. Upon withdrawal of the trocar, the seed is pushed into the lumen of the instrument by the spring clip. There is also provided a wire obturator or plunger, fitting loosely into the lumen of the instrument, and functioning to push the seed through the lumen of the instrument and thereafter deposit the seed in tissue. This thin obturator or plunger allows sufficient clearance between itself and the wall of the instrument proper to accommodate the seed thread and prevent jamming.

The disadvantages of instruments of this type are:

1. A relatively long time is required to adjust the seed in the loading slot with the spring clip.

2. It is necessary to withdraw the trocar after the tissue has been punctured, thereby presenting the possibility of shifting the position of the tip or distal end of the implanter, with the result that the seed may be deposited or implanted in the wrong place.

3. The introduction of the wire obturator increases the time of implantation.

4. It is necessary to push the seed the entire length of the instrument while the needle point is in the tissue. If the operator does not give sufficient attention to the introduction of the obturator and the passage of the seed through the lumen of the instrument, there is a possibility of the seed thread jamming the instrument.

5. The instrument is customarily made of a brass tube having a needle point made of Monel metal soldered thereto. Since it is necessary to sterilize the instrument before and after use, it is obvious that the presence of three dissimilar metal constituents, namely, Monel metal, brass and solder, each with a different coefficient of expansion, introduces difficulties. After several applications of heat, part of the solder works out and into the lumen of the implanter, and the entire alignment of the instrument is destroyed. Further, the impurities collect in the lumen of the instrument, tending to cause rusting and clogging which of course makes the instrument valueless for implantation work.

The object of the present invention is the provision of an instrument which eliminates the defects above pointed out, and simplifies the implantation of the removable seeds.

Broadly, the present invention is directed to an instrument for the implantation in tissue of radon seeds provided with a removal or withdrawal member, comprising a tubular seed-receiving member provided at one of its ends with a needle point and having intermediate its ends a lateral seed receiving opening leading into the tubular member. The instrument is provided with an obturator removable from the seed receiving member for discharging seeds therefrom, and the obturator is provided with means to insure a tight fit with the upper portion of the tubular bore and provides sufficient frictional resistance to prevent the obturator from sliding along the tubular bore on inversion of the instrument. More specifically, the obturator is provided with a lower body portion of a diameter substantially smaller than the internal diameter of the bore of the tubular seed-receiving member to allow sufficient room for the removal member of the seed to slide easily along the bore, and an enlarged upper portion tightly fitting in the bore and providing sufficient frictional resistance to prevent the obturator from sliding along the tubular bore on inversion of the instrument.

The seed-receiving tube in the preferred form of the invention extends throughout the length of the instrument and is made of a single material, thereby eliminating disturbances in alignment due to the presence of dissimilar materials having varying degrees of expansion and contraction. This affords means broadly for insuring the permanent maintenance of the alignment of the instrument. The tubular receiving member is made of a non-corrosive material having the advantages pointed out above. The lateral seed opening is provided with a recess adapted to hold and guide the removal member of the seed during the step of loading, this recess being preferably, but not necessarily, in the end wall of the loading slot.

In order that the invention may be clearly understood, reference is made to the accompanying drawings, in which:

Figure 1 is a plan view of the implanting instrument with the plunger of obturator in position;

Figure 2 is a plan view of the plunger or obturator;

Figure 3 is a longitudinal sectional view of the instrument;

Figure 4 is a plan view of the implanter, showing the plunger or obturator entirely withdrawn and a removable radon seed about to be placed in the loading slot, the removable part of the seed being directed towards the operator;

Figure 5 is a plan view showing the removable radon seed in position and the plunger or obturator being introduced into the bore or lumen of the implanter;

Figure 6 is a longitudinal sectional view showing the plunger or obturator in place and ready for the implantation operation;

Figure 7 is a longitudinal sectional view showing the final position of the instrument, the obturator, and the seed implanted in tissue;

The instrument set forth in the drawings is composed of a body portion 1, and a plunger or obturator 2. The body portion comprises a seed-receiving tube 3 having a bore or lumen 4, the tube 3 being of a material which is non-corrosive, such as an iron-chromium alloy. The seed-receiving tube 3, extending throughout the entire length of the implanter, is provided with a pointed needle end 5, adapted to puncture the tissue at the time of implantation. The non-corrosive seed-receiving tube 3 is reinforced by a brass shank 6, and both are countersunk to provide a lateral seed opening or loading slot 7 for receiving a removable seed 19. The reinforcing member 6 is of greater outside diameter at 8 near the loading slot 7 in order to confer rigidity upon the instrument. The brass reinforcing member is soldered to the tube 3 at 9. The countersunk groove or lateral seed loading opening has end walls 10 and 11 and side walls 12 and 13, all extending at an acute angle to the axis of the bore. The end wall 10 is cut away as at 15 to allow the removable member 20 to rest in the recess 14, the latter also acting as a guide for the removable member.

The plunger or obturator 2 comprises a relatively thin lower body portion 16, an upper enlarged body portion 17, and a head 18. The lower thin body portion 16 has a length extending from the needle point 5 to the loading slot end wall 10, near the proximal end of the instrument, and the upper thick body portion 17 extends the remaining length of the obturator 2. According to this construction, when the obturator 2 is introduced into the lumen 4 of the instrument, the loading slot 7 is entirely clear of the thick obturator upper body portion 17. The function of the upper thick body portion is to provide sufficient frictional resistance when introduced into the lumen so as to not slide in or out thereof when the instrument is inverted, an application of pressure being necessary to initiate movement of the obturator.

The diameter of the lumen 4 is considerably larger than the diameter of the obturator lower body portion 16, thereby, as indicated in Figures 3 and 7, allowing sufficient clearance to accommodate the removal member or thread 20 of the seed 19. The thread 20 of the seed 19 may be any length, without being entangled or caught in the lumen 4 of the instrument, there being no possibility of the upper thick obturator portion 17 catching the thread 20, the former not being long enough to reach past the wall 10 of the loading slot 7.

In using the instrument, the obturator 2 is entirely withdrawn from the lumen 4 of the tube 3, as shown in Figure 4. The seed 19, having a removal member 20, is placed in the loading slot 7 by means of a forcep 21, the thread end 20 of the seed 19 being held away from the tip of the needle—that is, towards the operator. The thread 20 is positioned in the recess 14 and hangs freely from the instrument. The obturator 2 is then introduced into the lumen 4, the obturator lower body portion 16 first entering the lumen. As it comes in contact with the seed 19, the latter is pushed along the lumen tube 3 until the upper enlarged body member 17 of the obturator enters the lumen 4 of the implanting instrument. At this point, a certain amount of resistance is offered to the penetration of the enlarged upper member 17 of the obturator, and the instrument is ready for use as indicated in Figure 6.

As shown, the seed 19 is positioned near the end of the seed-receiving tube 3, and the operator can hold the instrument either horizontally or in an inverted vertical position, and the obturator 2 will not fall out of the implanting instrument. The relationship between the inside diameter of the lumen 3 and the outside diameter of the obturator body portion 17 is such as to provide a tight frictional contact. The tissue is thereafter punctured and the obturator 2 pushed home, thereby depositing the seed in the tissue. The instrument may be then withdrawn and since there is sufficient clearance between the lower body portion 16 of the obturator 2 and the wall of the tube 3 to accommodate the thread 20 of the seed 19, the latter will not be discharged from the tissue but will remain implanted, the thread protruding from the portal of entry.

Without limiting the invention to any particular size of the needle tube and the obturator, the following are given as satisfactory dimensions:

The radon seeds are usually 1.1 mm. in outside diameter, and the inside diameter of the non-corrosive tube 3 is approximately 1.2 mm. The outside diameter of the upper body portion 17 of the obturator is preferably 1.15 mm. and the diameter of the lower body portion 76 is preferably .75 mm.

The advantages offered by the instrument herein set forth are as follows:

1. The seed is not loaded after the tissue is punctured, but prior thereto, so that the operator can disregard the instrument and direct his attention on the actual implantation of the removable seed.

2. The time of implantation is reduced to a minimum, so that the implantation of the seed becomes less hazardous.

3. Just prior to the time of implantation, it is only necessary to use a very short motion to push the seeds a few millimeters to actually deposit the seed into the tissue, thereby eliminating the possibility of entangling the thread. This is brought about by the relatively small linear dimension of the enlarged obturator body portion.

4. The non-corrosive needle or seed-receiving member extending through the entire length of the instrument insures the maintenance of the alignment of the instrument and the absence of solder in the lumen of the implanter prevents the seeds from becoming jammed during the operation.

Manufacturers of instruments have in the past pointed out that the soldering of the needle point to the remainder of the barrel of the instrument was always a delicate operation inasmuch as if too much solder was used there was always the possibility of the solder becoming caught upon the inside of the tube, thereby reducing the diameter thereof and making the instrument inoperative. This is of course avoided by the use of a tube of non-corrosive metal extending the entire length of the instrument.

The obturator is provided with a head 18. The head may, as shown in the drawings, be of the same size as the head of the instrument proper, but preferably should be somewhat larger in order to facilitate the withdrawal of the obturator from the instrument.

What I claim is:

1. An instrument for the implantation in tissue of radon seeds provided with a removal or withdrawal member comprising a tubular receiving member provided at one of its ends with a needle point and having intermediate its ends a lateral seed opening leading into said tubular member, a recess in the end wall of said lateral seed opening adapted to hold and guide the removal member of the seed during the loading step, and an obturator movable through the passage of the tubular member for discharging seeds therefrom, said obturator having a lower body portion of a diameter substantially smaller than the internal diameter of the bore of the tubular receiving member to allow sufficient room for the removal member of the seed to slide along the bore, and an enlarged upper body portion extending from the upper end wall of the lateral seed opening to the proximal end of the tubular bore, and tightly fitting in the bore to provide sufficient frictional resistance to prevent the obturator from sliding along the tubular member on inversion of the instrument.

2. An instrument for the implantation in tissue of radon seeds provided with a removal or withdrawal member comprising a non-corrosive tubular receiving member extending throughout the length of the instrument and made of a single material thereby eliminating disturbances in alignment, said tubular member being provided with a needle point and having intermediate its ends a lateral seed opening leading into said tubular member, a recess in the end wall of said lateral seed opening adapted to hold and guide the removal member of the seed during the loading step, and an obturator movable through the passage of the tubular member for discharging seeds therefrom, said obturator having a lower body portion of a diameter substantially smaller than the internal diameter of the bore of the tubular receiving member to allow sufficient room for the removal member of the seed to slide along the bore, and an enlarged upper body portion extending from the upper end wall of the lateral seed opening to the proximal end of the tubular bore, and tightly fitting in the bore to provide sufficient frictional resistance to prevent the obturator from sliding along the tubular member on inversion of the instrument.

In testimony whereof I hereunto affix my signature.

JOSEPH MUIR.